May 7, 1929.   A. ANDERBERG ET AL   1,712,016
COMPRESSED AIR BRAKE
Filed Jan. 9, 1928
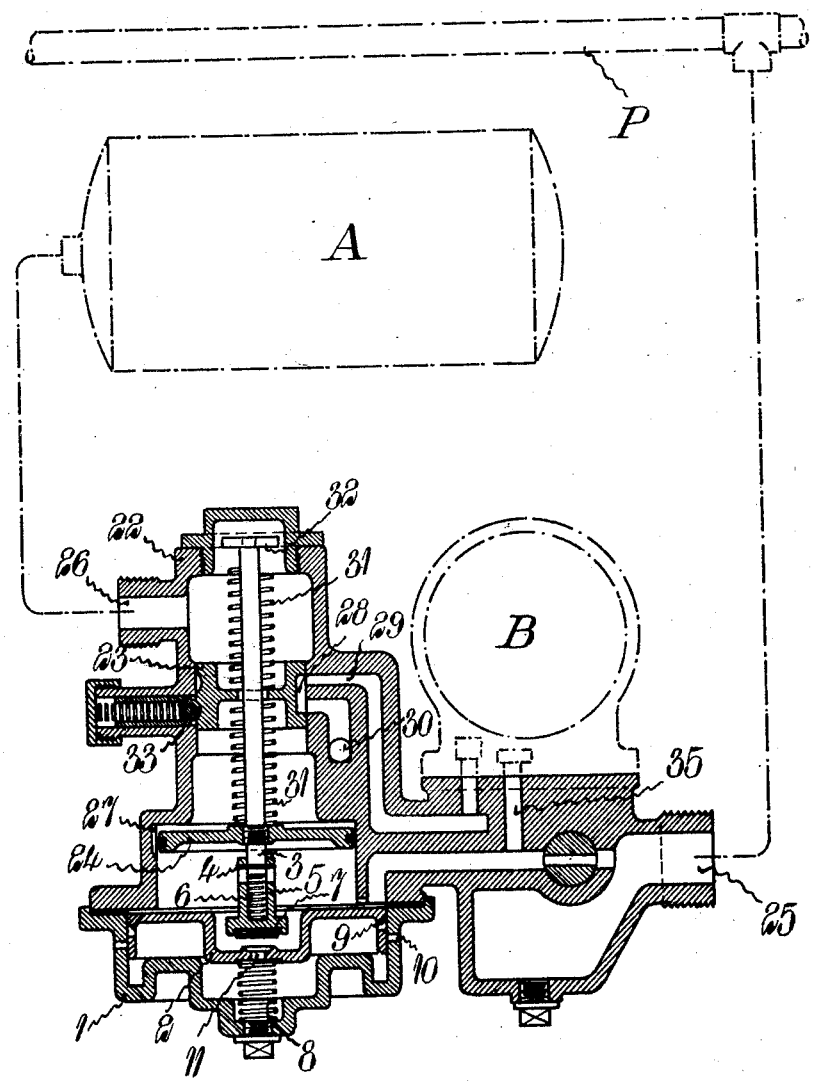
Inventors:
Anders Anderberg
and Erik Anders Anderberg
By
Attorney Patented May 7, 1929.

UNITED STATES PATENT OFFICE.

1,712,016

ANDERS ANDERBERG AND ERIK ANDERS ANDERBERG, OF MALMO, SWEDEN, ASSIGNORS TO CARL HOLMBERGS MEKANISKA VERKSTADS AKTIEBOLAG, OF LUND, SWEDEN, A CORPORATION OF SWEDEN.

COMPRESSED-AIR BRAKE.

Application filed January 9, 1928, Serial No. 245,540, and in Sweden December 16, 1927.

Our present invention refers to an improvement in compressed air brakes and more specifically to a device for acceleration of the velocity of propagation of the decrease in pressure within the main brake pipe when braking.

An acceleration device of this kind is an arrangement for the purpose of removing the volume or body of air displaced by the piston of the control valve or triple valve from the system when braking, so that such air is not carried back to the main pipe, which circumstance, in the case of long trains comprising a large number of braking cars and a corresponding number of control valves, might cause an unintentional increase in pressure within the main pipe, thereby raising the pressure once decreased for the purpose of braking, so that the advancing movement of the brake shoes is delayed, especially nearest to the rear end of the train.

The way which first suggests itself for obtaining such a function is, of course, to arrange within the control valve a cavity or chamber which is connected to the main pipe and into which the stroke volume of the control piston is transferred when braking and thereafter permitted to escape to the atmosphere when releasing the brakes simultaneously with an interruption of the connection between said chamber and the control valve. This solution of the problem has also been previously proposed but it makes necessary substantial changes in the construction of the control valve housing and its slide valve member, which latter must be provided with cavities and openings for connection of the chamber alternately with the main pipe and with the atmosphere according to the position of the control piston for said slide valve member. In practice these conditions make it impossible to carry out the changes needed without a complete substitution of the old control valve as a whole by a new valve provided with the acceleration arrangements.

The present invention has for its purpose to do away with this drawback by providing an acceleration device which, without any alteration at all of the control valve housing or its control members, may be applied to the known control valves already in use.

In the following, the invention will be described with reference to the accompanying drawing which shows the same applied to a control valve of the kind described in our prior Patent No. 1,663,579, but it will be obvious to anyone skilled in the art that the invention may be combined equally well with any other control valve structure having a reciprocable control piston or the like, for instance a diaphragm, the movements of which will cause a displacement of a certain quantity of air.—The drawing shows the control valve and the acceleration attachment in longitudinal section, the parts of the brake system having no direct connection with the invention being represented in dotted lines.

The acceleration device according to the invention is intended to be positioned as a whole at that end of the control chamber or cylinder of the control valve which is connected to the main pipe so as to form a cover on said chamber at that end, and according to the construction illustrated said cover 1 is made in the form of a cylinder for a tightly fitting reciprocable piston 2 provided with a hole 11 placed suitably at the central portion of the piston and extending through the same in axial direction. The control piston 24 is provided with a piston rod having a portion 3 which extends downwardly below the piston and carries a cross-pin 4. The extension is further surrounded by a sleeve 5 forming the spindle of a valve 7 and the walls of said sleeve are provided with axially extended oblong holes or slots for the ends of the pin 4, so that the valve within certain limits determined by said holes or slots may be axially displaced in relation to the extension 3. A spring 6 is arranged within the sleeve 5 between the end of the extension 3 and the valve 7 and constantly tends to push the valve as far away as possible from the piston 24, the lower end position of the valve being determined by the means described above. The valve 7 is placed in axial alignment with the hole 11 in piston 2 and serves as a means for closing the same as will be described below.

The piston 2 is constantly pressed toward the control piston 24 by means of a return spring 8 and its upward movement is limited by suitable abutments, so that said piston 2 normally forms the bottom wall of the control piston cylinder, which bottom is normally open to the space below the piston 2 by means of the hole 11. The piston 2 is further provided with one or more radial holes or ports 9 coacting with corresponding holes or ports 10 in the wall of the cylinder 1 for the purpose of establishing communication between the interior of the said cylinder below the piston 2 and the atmosphere when the piston is moved downwardly in the manner described below.

The control valve structure is connected by means of the nipple 25 with the main pipe P and by means of the nipple 26 with the auxiliary air reservoir A or its equivalent, such as for instance a so-called working chamber, and said valve structure is provided with a channel 29 leading to the working chamber of the brake device B, a channel 30 leading to the atmosphere and a channel 35 leading to the function chamber of the brake.

The operation of the device is as follows:—

In the drawing the parts of the valve structure are shown in the positions which they assume when the brakes are released, i. e. a condition in which the brakes are loaded and ready for braking.—When braking, the pressure within the main pipe P is decreased by a suitable manipulation of the driver's valve (not shown) and thereby the pressure beneath the piston 24 is also decreased. Then the pressure within the auxiliary air reservoir A in a manner known per se will push down the piston 24, so that the known feed groove 27 is closed, this movement corresponding to the distance between the upper end of the upper spring 31 and the abutment 32 on the control piston rod. At the end of this movement of the piston 24, the valve 7 comes to rest against a seat arranged around the hole 11 in the piston 2, and during the continued downward movement of the piston 24 the spring 6 will be compressed to a degree limited by the pin 4 and the slots in the sleeve 5. Thereafter the piston 2 must join in the downward movement of the piston 24 and then the ports 9 and 10 come into register with the result that the air at present beneath the piston 2 escapes to the atmosphere, the piston 2 being further pressed down by means of the piston 24 and the higher pressure at hand on the upper side of the same, until the lowermost position is reached in which the ports 9, 10 are still in register. Simultaneously with the piston 2 the piston 24 has also moved downwardly until its lowest position is reached, and it will be obvious that even if the piston 24 should lag behind in the downward movement the hole 11 nevertheless will not be opened, since the spring 6 in the manner described above has been compressed and presses the valve 7 against its seat.

Any difference in velocity of movement of the pistons 2 and 24 will thus be equalized by the spring 6, and in this connection it will be noted that the velocity of the piston 2 at the downward movement is dependent on the free area of the coacting holes 9 and 10 which easily may be altered at will.

In the operation just described the piston 24 has thus moved downwardly and compressed the upper spring 31, the spring pressure thus accumulated being sufficient to overcome the retarding action of the arresting means 33 on the slide valve 23 and thus carry said valve to its lower position in which the channel 29 is open so that air from the auxiliary air reservoir A is admitted to the brakes.—The increase in pressure which otherwise would have arisen in the main pipe due to the downward movement of the piston 24 is equalized by the downward movement of the piston 2 increasing the main pipe volume as a whole, and the diameter of the piston 2 is of course to be chosen in such a manner that its stroke volume is equal to or even somewhat greater than the stroke volume of the piston 24.

On releasing the brakes no change in the position of the different parts as described occurs until the pressure within the main pipe P has been increased to a value higher than the pressure within the auxiliary air reservoir A. When this difference is obtained, the piston 24 will be pressed upwardly again whereby the valve 7 will be kept closed as long as the pin 4 moves freely in the slots of the sleeve 5. When such free movement is no longer possible the hole 11 is opened and the pressure is transmitted also to the under side of the piston 2 which then moves upwardly aided also by the spring 8. The velocity of this upward movement of the piston 2 is of course dependent on the free area of the hole 11 which also may be altered at will.

It will thus be obvious that the space below the piston 2 will not receive a charge of compressed air until during the last period of the releasing of the brakes. This means an advantage, because during the gradual alterations of the braking force, which oftentimes must be used after the brake shoes have been advanced towards the wheels, the acceleration device will, of course, not be responsive to the smaller alterations in pressure, since a reverse condition would cause an unnecessary consumption of compressed air.

As will be understood at once from the drawing, the acceleration device according to the invention may be mounted on control valves already in use without any alteration of the valve structure at all. The cover which is always arranged beneath the piston 24 may be removed and replaced by the member 1 forming the acceleration cylinder together with the parts mounted within the latter. The extension 3 of the piston rod is already present in most of the valves in use, since it has for its general purpose to facilitate the withdrawal of the piston 24 from its cylinder for inspection purposes.

From the foregoing it will also be noted that the invention, from the standpoint of its function, is analogous to the arrangements previously proposed for the same purpose, but that the mode of operation and the structural features of the invention for obtaining its object are entirely different from those of earlier constructions. The advantages gained by the invention will be most clearly seen from the fact that the same at a minimum of expense may be applied to old control valves already in use, but when considering also the fact that not all of the control valves need to be provided with any acceleration device the invention involves also the advantage that all of the valves may be constructed in the same manner, whether they are intended to be provided with acceleration device or not, the difference being an additional feature only, and this fact means a great advantage in the manufacture of the valves and in the accessibility of spare parts.

It is obvious that the attainment of these advantages must imply the application of a completely new principle of connection, and in the present case there cannot be said to be any special transfer chamber, since the same is normally in free communication with the control valve cylinder and besides at the movement of the control piston it changes its volume; nor can it be said that such a chamber, as in the known arrangements, is brought into communication with the main pipe during braking, since the communication is present previous to the braking and is broken or interrupted when braking occurs.

The embodiment shown in the drawing for the purpose of explaining the invention has been chosen in order to make the invention clearly understood, but in practice the constructional features described may be varied in many ways, the main point being the expansible chamber at that side of the control piston acted upon by the main pipe pressure. The means for tightening the acceleration piston may also be constructed in many ways, and the same is true with regard to the means for connecting the space below said piston with the atmosphere, as well as the means for closing the hole through said piston when the control piston has moved through so great a part of its stroke that the feed grooves 27 are closed.

Both the control piston 24 and the acceleration piston 2 or either of them, for instance the latter piston, may of course be replaced by equivalents, such as for instance diaphragms, and although the invention has been described above in connection with the usual control valve or triple valve, which connection no doubt will be the most common one in practice, there is nothing to prevent the invention from also being used in connection with other control means acted upon by the main pipe pressure, even if such control means are of a special nature and coupled to the brake system for the purpose of actuating the acceleration device only.

What we claim is:—

1. In a compressed air brake system, a main brake pipe, a movable control member actuated by the pressure within said main pipe, a chamber surrounding said control member, a movable wall confining said chamber and determining the volume of the same, and means connected with the control member and acting upon said movable wall for increasing the volume of said chamber in proportion to the decrease of the same due to the movement of the control member caused by a decrease in pressure within the main pipe.

2. In a compressed air brake system, a main pressure pipe, a compressed air chamber, a movable control member acted upon at one side by the pressure within the main pipe and at the other side by the pressure within said chamber so as to move in correspondence with the differences in pressure, an acceleration chamber connected to the main pipe, a movable acceleration member arranged in said last mentioned chamber and dividing the same in two parts, normally open communication means between both parts of the acceleration chamber, valve means for closing said communication means, interconnecting means between the movable control member and said valve means for the purpose of closing the latter during the movement of the control member caused by a decrease in pressure within the main pipe, means for causing the acceleration member to move in unison with the control member after the said valve means has been closed, and means for exposing the acceleration chamber to the atmosphere during the movement of the acceleration member and at that side of said member not acted upon by the main pipe pressure after the closing of the aforesaid valve means.

3. In a compressed air brake system, a movable control member, a main pressure pipe, means for conveying the pressure within the said pipe to one side of said control member, a compressed air chamber, means for conveying the pressure within said chamber to the other side of the control member, an acceleration cylinder connected to the main pipe, a movable acceleration piston reciprocably arranged in said cylinder and having a normally open aperture forming a communication channel between both sides of the same, valve means for closing said communication channel, interconnecting means between the control member and said valve means for the purpose of closing the same during the movement of the control member caused by a decrease in pressure within the main pipe, means for causing the acceleration piston to move in unison with the control member after the said valve means has been closed, and means for exposing the interior of the acceleration cylinder to the atmosphere during the travel of the acceleration piston and at that side of said piston not acted upon by the main pipe pressure after closing of the aforesaid valve means.

4. In a compressed air brake system, a main pressure pipe, a compressed air chamber, a movable control piston reciprocably positioned within a corresponding cylinder and acted upon at one side by the pressure within the main pipe and at the other side by the pressure within said air chamber so as to move in correspondence with the differences in pressure, an acceleration cylinder placed in axial alignment with the control piston cylinder in free communication with the latter at that end of the same connected to the main pipe, an acceleration piston reciprocably positioned within the acceleration cylinder and dividing the same in two chambers, normally open communication means between both sides of the acceleration piston, valve means for closing said communication means, interconnecting means between the movable control piston and said valve means for the purpose of closing the latter during the movement of the control piston due to a decrease in pressure within the main pipe, means for causing the acceleration piston to move in unison with the control piston after the said valve means has been closed, and means for exposing the acceleration cylinder to the atmosphere during the movement of the acceleration piston and at that side of the same shut off from the main pipe after the closing of the aforesaid valve means.

5. In a compressed air brake system, a main pressure pipe, a compressed air chamber, a movable control piston reciprocably positioned within a corresponding cylinder and acted upon at one side by the pressure within the main pipe and at the opposite side by the pressure within said air chamber, an acceleration cylinder placed in the direct elongation of the control piston cylinder and forming a cover for the latter at that side of the same connected to the main pipe, an acceleration piston reciprocably positioned within the acceleration cylinder and dividing the same in two chambers, normally open communication means between both sides of the acceleration piston, valve means slidably connected with the acceleration piston in position for closing said communication means when the control piston is moved towards the acceleration piston, spring means for advancing said valve means towards the acceleration piston, spring means for advancing the acceleration piston towards the control piston, means for limiting the sliding movement between the valve means and the control piston so as to cause a movement of the acceleration piston in unison with the control piston, and means for exposing the acceleration cylinder to the atmosphere during the movement of the acceleration piston and at that side of the same shut off from the main pipe after the closing of the aforesaid valve means.

In testimony whereof we have signed our names to this specification.

ANDERS ANDERBERG.
ERIK ANDERS ANDERBERG.